United States Patent [19]
Nishio et al.

[11] Patent Number: 5,907,551
[45] Date of Patent: May 25, 1999

[54] ATM SWITCHING SYSTEM WITH DISTRIBUTION NETWORKS FOR VARYING TRAFFIC PATTERNS

[75] Inventors: Makoto Nishio; Kazuo Takagi, both of Tokyo, Japan

[73] Assignee: NEC Corporation, Tokyo, Japan

[21] Appl. No.: 08/800,186

[22] Filed: Feb. 13, 1997

[30] Foreign Application Priority Data

Feb. 13, 1996 [JP] Japan ................................. 8-025181

[51] Int. Cl.⁶ .................................................. H04L 12/56
[52] U.S. Cl. ............................................ 370/395; 370/419
[58] Field of Search ..................................... 370/361, 380, 370/388, 391, 395, 399, 397, 419, 427, 386, 366, 359; 359/127, 128

[56] References Cited

U.S. PATENT DOCUMENTS

| | | | |
|---|---|---|---|
| 5,359,600 | 10/1994 | Ueda et al. ........................... | 370/399 |
| 5,506,714 | 4/1996 | Nishio .................................... | 370/395 |
| 5,555,243 | 9/1996 | Kakuma et al. ...................... | 370/352 |
| 5,568,300 | 10/1996 | Ishibashi .............................. | 370/419 |
| 5,740,156 | 4/1998 | Tanabe et al. ........................ | 370/409 |

*Primary Examiner*—Chau Nguyen
*Assistant Examiner*—Soon-Dong Hyun
*Attorney, Agent, or Firm*—Scully, Scott, Murphy & Presser

[57] ABSTRACT

In an ATM switching system, bi-directionally coupling devices establish connections between corresponding interface units and an ATM switching module. The switching module includes a self-routing switch, an input distribution network for establishing connections between the bi-directionally coupling devices and the input ports of the self-routing switch, and an output distribution network for establishing connections between the output ports of the self-routing switch and bi-directionally coupling devices. The bi-directionally coupling devices and the input and output distribution networks are controlled in accordance with data supplied from the interface units indicating the directions of signals passing through the interface units and the operating speed of the interface units.

20 Claims, 6 Drawing Sheets

ATM SWITCHING SYSTEM WITH DISTRIBUTION NETWORKS FOR VARYING TRAFFIC PATTERNS

BACKGROUND OF THE INVENTION

1. Field of the Invention the present invention relates generally to ATM (asynchronous transfer mode) switching systems, and more specifically to an ATM switching system particularly suitable for varying traffic patterns.

2. Description of the Related Art

For broadband ISDN, optical links will be used to interconnect a plurality of ATM network nodes in which the links are connected to an ATM switching module via an array of interface units where conversion is performed between optical signals and electrical signals. In the ATM system, a plurality of ATM data streams destined for different destinations can be statistically multiplexed into a single data stream, and the latter may be demultiplexed at a network node into the component streams according to the destination addresses contained in the cell headers of the component streams. However, the entry point of the node where the multiplexed signal appears is interfaced with an optoelectrical converter and the exit points where the demultiplexed components appear are interfaced with respective electro-optical converters. Thus, the numbers of O/E and E/O converters of an ATM network node may differ from each other. This is undesirable from the design standpoint of an ATM switching system because of the difficulty to predict the number of such interface units which will be required in the future. This asymmetric relationship is further compounded by the fact that, in the B-ISDN, the traffic pattern of each network node varies significantly due to the wide range of services that need different transmission speeds, or bandwidths. Particularly, the outgoing and incoming traffic volumes of a video service provider are significantly greater than the corresponding traffic volumes of its subscribers.

One approach is to employ an optical distribution frame to establish connections between the optical transmission links and the input and output ports of the ATM switching module.

However, in order to meet a wide range of varying traffic patterns the distribution frame is not satisfactory for reconfiguring the connections to such an extent that the ATM switching module operates at the best possible efficiency. In addition, manual work is involved when reconfiguring the connections.

SUMMARY OF THE INVENTION

It is therefore an object of the present invention to provide an ATM switching system capable of meeting varying traffic patterns while ensuring efficient utilization of a self-routing switch.

The object is attained by the provision of an input distribution network connected to the input ports of a self-routing switch and an output distribution network connected to the output ports of the self-routing switch for reconfiguring incoming and outgoing data streams according to varying traffic patterns.

According to one aspect of the present invention, there is provided an ATM switching system comprising a plurality of interface units, a plurality of bi-directionally coupling devices corresponding to the interface units, each of the switches having first and second terminals and establishing a connection between the corresponding interface unit and one of the first and second terminals, a self-routing switch having a plurality of input ports and a plurality of output ports, an input distribution network for establishing connections between the first terminals of the bi-directionally coupling devices and the input ports of the self-routing switch, and an output distribution network for establishing connections between the output ports of the self-routing switch and the second terminals of the bi-directionally coupling devices. A controller is provided for controlling the bi-directionally coupling devices, the input and output distribution networks in accordance with directions of signals passing through the interface units and operating speed of the interface units.

According to a second aspect, the present invention provides an ATM switching system which comprises a plurality of interface units each having first, second and third terminals for interfacing between the first terminal and one of the second and third terminals, a self-routing switch having a plurality of input ports and a plurality of output ports, an input distribution network for establishing connections between the second terminals of the interface units and the input ports of the self-routing switch, and an output distribution network for establishing connections between the output ports of the self-routing switch and the third terminals of the interface units. A controller controls the input and output distribution networks in accordance with directions of signals passing through the interface units and operating speed of the interface units.

Specifically, the input distribution network comprises a plurality of selectors each having an input terminal and a plurality of output terminals, each selector selectively establishing a connection between the input terminal and one of the output terminals according to a first control signal applied thereto, and a plurality of first multiplexers each having a plurality of input terminals and an output terminal connected to one of the input ports of the self-routing switch, the input terminals of each first multiplexer being connected to receive signals from a different one of the selectors. The output distribution network comprises a plurality of demultiplexers each having an input terminal connected to one of the output ports of the self-routing switch and a plurality of output terminals, each demultiplexer establishing a connection between the input terminal and the output terminals according to a second control signal applied thereto, and a plurality of second multiplexers each having a plurality of input terminals and an output terminal, the input terminals of each second multiplexer being connected to receive signals from any one of the demultiplexers.

BRIEF DESCRIPTION OF THE DRAWINGS

The present invention will be described in further detail with reference to the accompanying drawings, in which.

DETAILED DESCRIPTION

Figure 1:
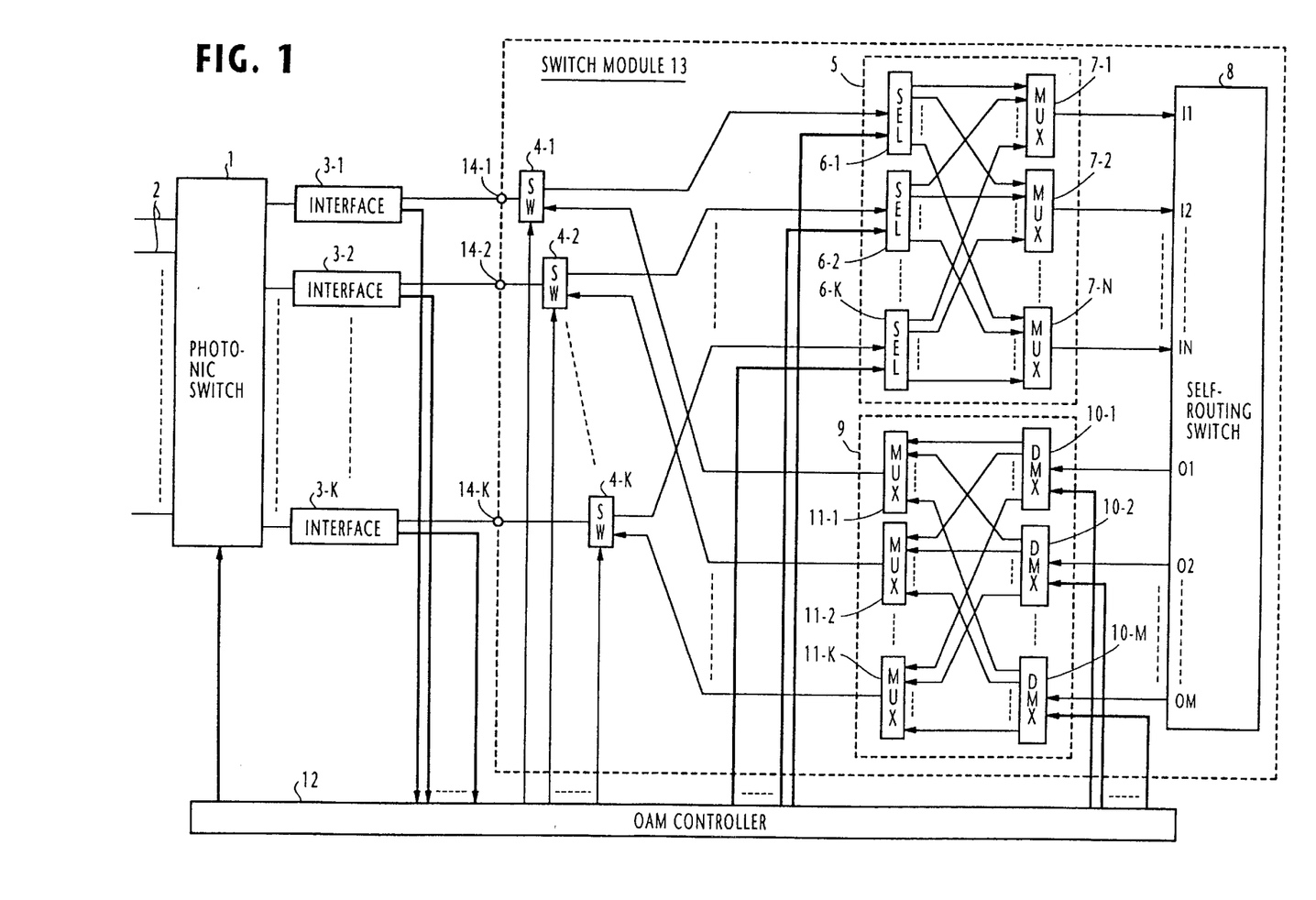
FIG. 1 is a block diagram of an ATM switching system of the present invention for use as an add-drop multiplexer (ADM) in an optical communication network.

An ATM (asynchronous transfer mode) switching system of the present invention for an optical communications network is shown in FIG. 1. The switching system includes a bi-directional photonic cross-connect switch 1 whose terminals are used either as incoming ports or outgoing ports and to these ports are connected a plurality of optical fiber transmission links 2 and a plurality of replaceable interface units 3-1 through 3-K. These interface units are provided for interfacing between the optical ports of switch 1 and electrical ports 14-1 through 14-k of an ATM switch module 13, and are implemented either with an electro-optical converter, an opto-electrical converter or both for operating as an incoming, outgoing or two-way interface. Details of the interface circuits will be discussed later with reference to FIGS. 2A to 2D.

Switch module 13 is an integrated-circuit module in which are integrated a plurality of directional switches 4-1 through 4-K, an input distribution network 5, an N×M self-routing switch 8 and an output distribution network 9.

Each of the directional switches 4 has an upper and a lower terminal and sets up a connection between a corresponding electrical port 14 of the module 13 and either of its upper and lower terminals depending on the direction of signals passing through it.

The input distribution network 5 comprises a plurality of selectors 6-1 through 6-K corresponding in number to switches 4 and a plurality of multiplexers 7-1 through 7-N corresponding in number to the input ports I1 through IN of the self-routing switch 8. Each selector 6 has one input port connected to the upper terminal of the corresponding switch 4 and N output ports and each multiplexer 7 has K input ports and one output port connected to the corresponding input port of self-routing switch 8. The output ports of each selector 6-i (where i=1,2, . . ., K) are connected to the i-th input ports of multiplexers 7-1 through 7-N so that the selector can access to any of these multiplexers.

The output distribution network 9 comprises a plurality of demultiplexers 10-1 through 10-M corresponding in number to the output ports O1 through OM of the self-routing switch 8 and a plurality of multiplexer 11-1 through 11-K corresponding in number to switches 4. Each demultiplexer 10 has one input port connected to the corresponding output port of self-routing switch 8 and K output ports and each multiplexer 11 has M input ports and one output port connected to the lower terminal of the corresponding switch 4. The output ports of each demultiplexer 10-j (where j=1, 2, . . ., M) are connected to the j-th input ports of multiplexers 11-1 through 11-K so that the demultiplexer can access to any of multiplexers 11.

An OAM (operations, administration and maintenance) controller 12 is provided for receiving control data from each interface unit 3 regarding the operating mode of the interface and its maximum operating speed and uses the control data to control the photonic switch 1, directional switches 4, selectors 6 and demultiplexers 10.

Interface units 3 of different operating modes are shown in FIGS. 2A to 2D. A mixed combination of interface units 3 are installed to meet the traffic requirements of a particular network node.

Figure 2A:
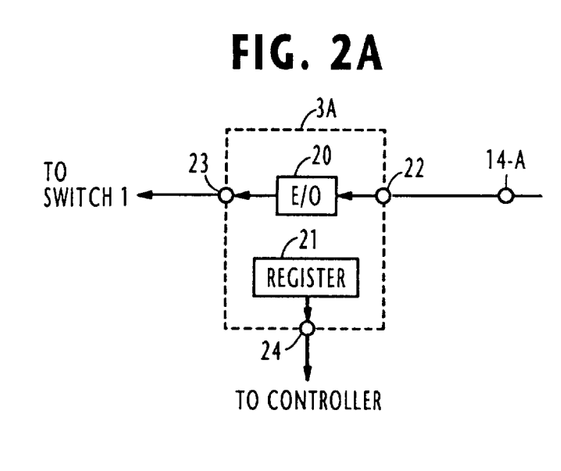
FIGS. 2A to 2D are block diagrams of different operating modes of interface units.

The interface unit of the operating mode shown at 3A in FIG. 2A is an outgoing interface and is implemented with an electro-optical converter 20 and a register 21 in which data concerning the operating mode of the interface unit 3A and its maximum operating speed are stored. When this interface unit is installed, the E/O converter 20 is connected through terminal 22 to a corresponding electrical output port 14-A and through terminal 23 to the photonic switch 1. At the same time, the data stored in register 21 are supplied via terminal 24 to the controller 12.

Figure 2B:
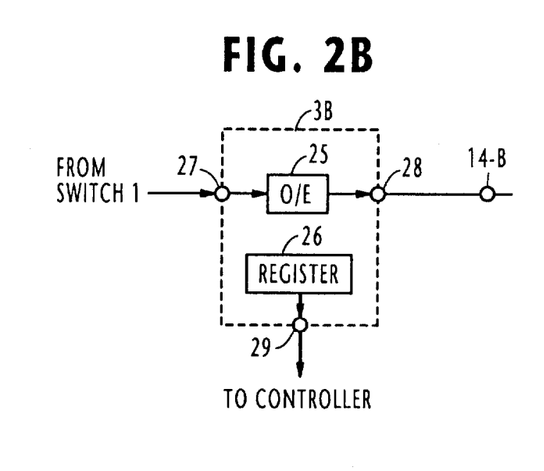

The interface unit of the operating mode shown at 3B in FIG. 2B is an incoming interface and is implemented with an opto-electrical converter 25 and a register 26 in which data concerning the operating mode of the interface unit 3B and its maximum operating speed are stored. When this interface unit is installed, the O/E converter 25 is connected through terminal 27 to the photonic switch 1 and through terminal 28 to the corresponding electrical input port 14-B, and the data stored in register 26 are supplied via terminal 29 to the controller 12.

Figure 2C:
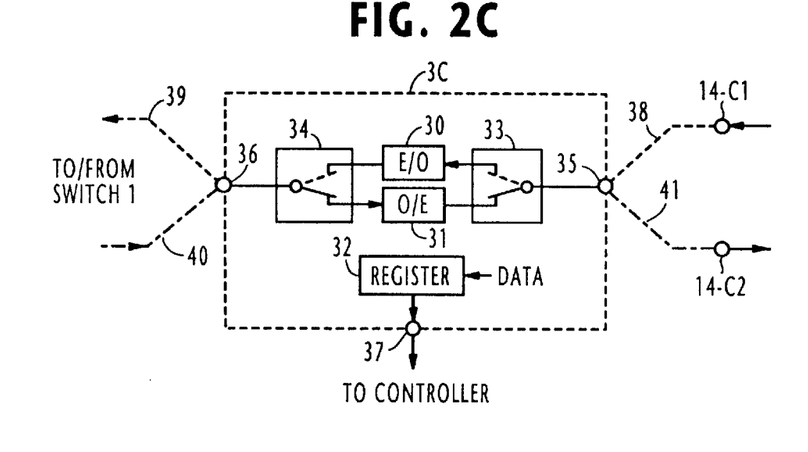

The interface unit of the operating mode shown at 3C in FIG. 2C is an incoming/outgoing interface and is implemented with an electro-optical converter 30, an opto-electrical converter 31 and a register 32. The converters 30 and 31 are connected by a manual switch 33 to a terminal 35 and by a manual switch 34 to a terminal 36. When this interface unit is installed as an outgoing interface, manual switches 33 and 34 are moved to upper position, and terminal 35 and an electrical output port 14-C1 are connected by a conductor 38 and terminal 36 and the switch 1 is connected by a conductor 39. When this interface unit is installed as an incoming interface, manual switches 33 and 34 are moved to lower position and terminal 35 and an electrical input port 14-C2 are connected by a conductor 41 and terminal 36 and the switch 1 is connected by a conductor 40. In either case, data indicating the corresponding mode of the interface and its maximum operating speed are manually set into the register 32 and supplied via terminal 37 to the controller 12.

Figure 2D:
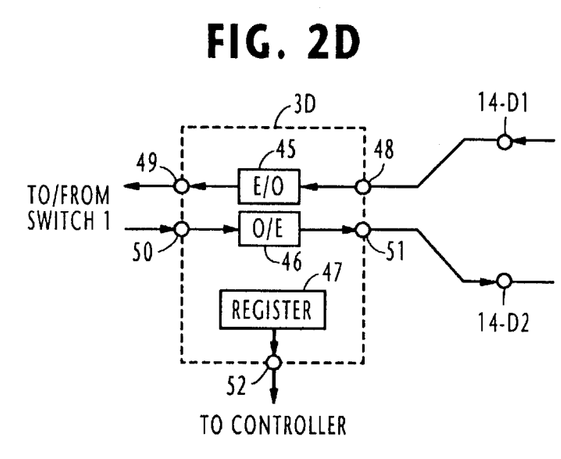

The interface unit of the operating mode shown at 3D in FIG. 2D is a two-way (full-duplex mode) interface and is implemented with an E/O converter 45, an O/E converter 46 and a register 47 in which data indicating this operating mode of interface and its maximum operating speed are stored. When this interface unit is installed, the E/O converter 45 is connected through terminal 48 to an electrical output port 14-D1 and through terminal 49 to the switch 1 and the O/E converter 46 is connected through terminal 50 to the switch 1 and through terminal 51 to an electrical input port 14-D1. The data stored in register 47 are supplied via terminal 52 to the controller 12.

Controller 12 includes a memory, not shown, in which the bandwidth (operating speed) data of each port of the self-routing switch 8 are stored. Using this data supplied from the interface units 3, the controller 12 makes a search through the memory for corresponding bandwidths and determines the mux/demux distribution of the networks 5 and 6.

Figure 3A:
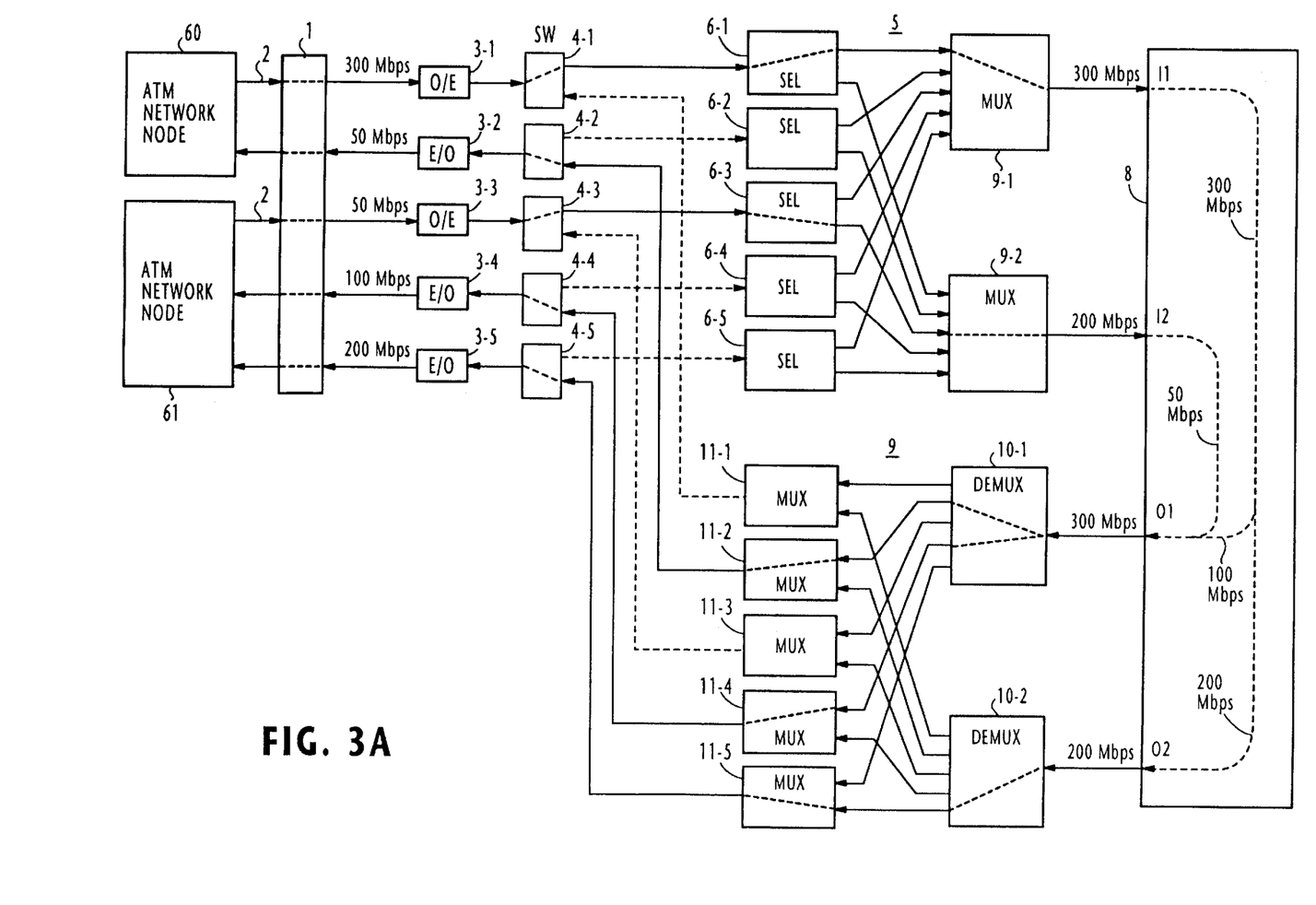
FIGS. 3A and 3B are simplified block diagrams of the ATM switching system for describing its operation for particular traffic patterns.

A typical operation of the ATM switching system of the present invention will be described with reference to FIG. 3A by assuming that an ATM network node 60 transmits data at 300 Mbps (=200 Mbps+100 Mbps) and receives data from an ATM network node 61 at 50 Mbps, while the node 61 sends data at 50 Mbps and receives the 200- and 100-Mbps data streams from node 60 over respective optical fibers and that the self-routing switch 8 has two input ports I1 and I2 with operating speeds of 300 and 200 Mbps, respectively, and two output ports O1 and O2 of operating speeds of 300 and 200 Mbps, respectively.

To meet the asymmetric traffic demands of the distant nodes, 300-Mbps and 50-Mbps O/E converters 3-1 and 3-3 are installed for reception of incoming signals from the nodes 60, 61 and 50-Mbps, 100-Mbps and 200-Mbps E/O converters 3-2, 3-4 and 3-5 are installed for transmission of outgoing signals to the nodes 60, 61. The controller 12 receives the operating mode and operating speed data from all the interface units 3 and operates the directional switches 4-1 and 4-3 so that they respectively connect the O/E converters 3-1 and 3-3 to selectors 6-1 and 6-3 and operates the directional switches 4-2, 4-4 and 4-5 so that they respectively connect multiplexers 11-2, 11-4 and 11-5 to the E/O converters 3-2, 3-4 and 3-5. In addition, the controller 12 controls the selectors 6-1 and 6-3 to establish respective connections to a multiplexers 9-1 and 9-2 so that the provider's 300-Mbps data is transmitted through multiplexer 9-1 to the input port I1 of self-routing switch 8 and the 50-Mbps data of node 61 is transmitted through multiplexer 9-2 to the input port I2. The controller 12 further controls the demultiplexers 10-1 and 10-2 to establish connections from the output port O1 to multiplexers 11-2 and 11-5 and a connection from the output port O2 to multiplexer 11-5. When demultiplexing signals, each of the demultiplexers 10-1 and 10-2 examines the header of ATM cells from the self-routing switch 8 to identify the data source and disassembles the cells according to the identified data sources into data streams and directs the data streams to appropriate one of multiplexers 11 according to the control signal from the controller 12. In the illustrated example, demultiplexer 10-1 disassembles the data stream from the output port O1 into 50-Mbps and 100-Mbps data streams using the contents of their headers and directs these data streams to multiplexers 11-2 and 11-4 which are specified by the controller 12.

In the self-routing switch 8, the provider's 100-Mbps and 200-Mbps data are separated from each other and respectively self-routed to output ports O1 and O2. The 100-Mbps data is transmitted from output port O1 through demultiplexer 10-1 and multiplexer 11-4 to the E/O converter 3-4, while the 200-Mbps data is transmitted from output port O2 through demultiplexer 10-2 and multiplexer 11-5 to the E/O converter 3-5. On the other hand, the 50-Mbps data of node 61 is self-routed to the output port O1, for example, and transmitted via demultiplexer 10-1 and multiplexer 11-2 to the E/O converter 3-2.

If there is a change in traffic needs, the arrangement of the interface units 3 is correspondingly modified and the controller 12 responds to this modification by controlling the directional switches 4 and reconfiguring the input and output distribution networks 5 and 9 while meeting the requirements that the total speed of incoming signals to the interface units 3 is equal to the total speed of the input ports of the self-routing switch 8 and the total speed of outgoing signals from the interface units 3 is equal to the total speed of the output ports of the switch 8.

Figure 3B:
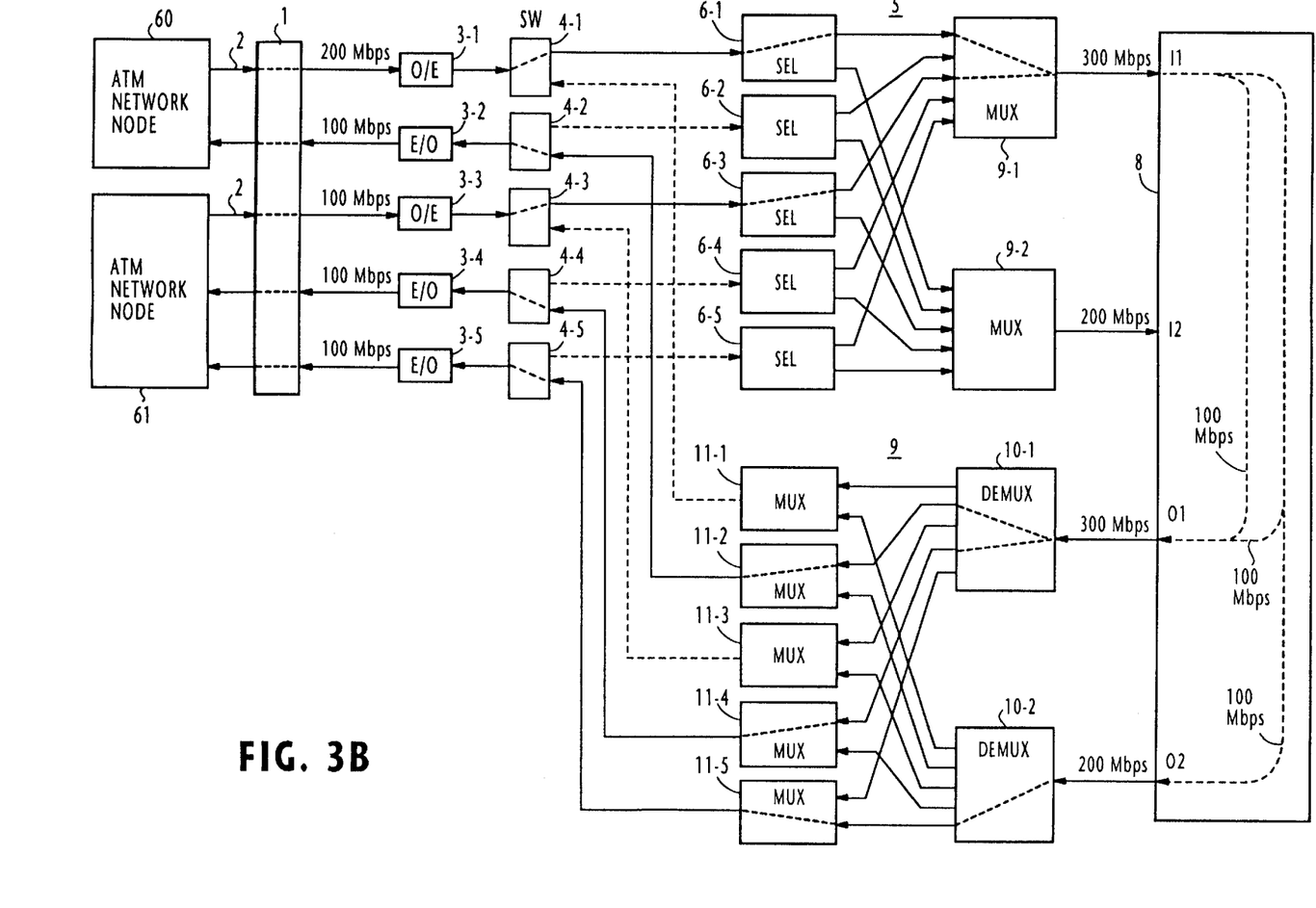

If the traffic patterns of nodes 60 and 61 vary shown in FIG. 3B, the controller 12 is notified of this change and reconfigures the networks 5 and 9 by controlling the multiplexer 9-1 to multiplex the outgoing data streams of these nodes and controlling the demultiplexer 10-1 to separate its 200-Mbps input data stream from the self-routing switch 8 into two 100-Mbps data streams and supplies them to multiplexers 11-2 and 11-4 respectively for transmission to nodes 60 and 61.

Due to the reconfigurable arrangement of the interface units 3 using directional switches 4 and the reconfigurable mux/demux arrangements of distribution networks 5 and 9, the self-routing switch 8 can be operated with a high utilization efficiency.

Figure 4:
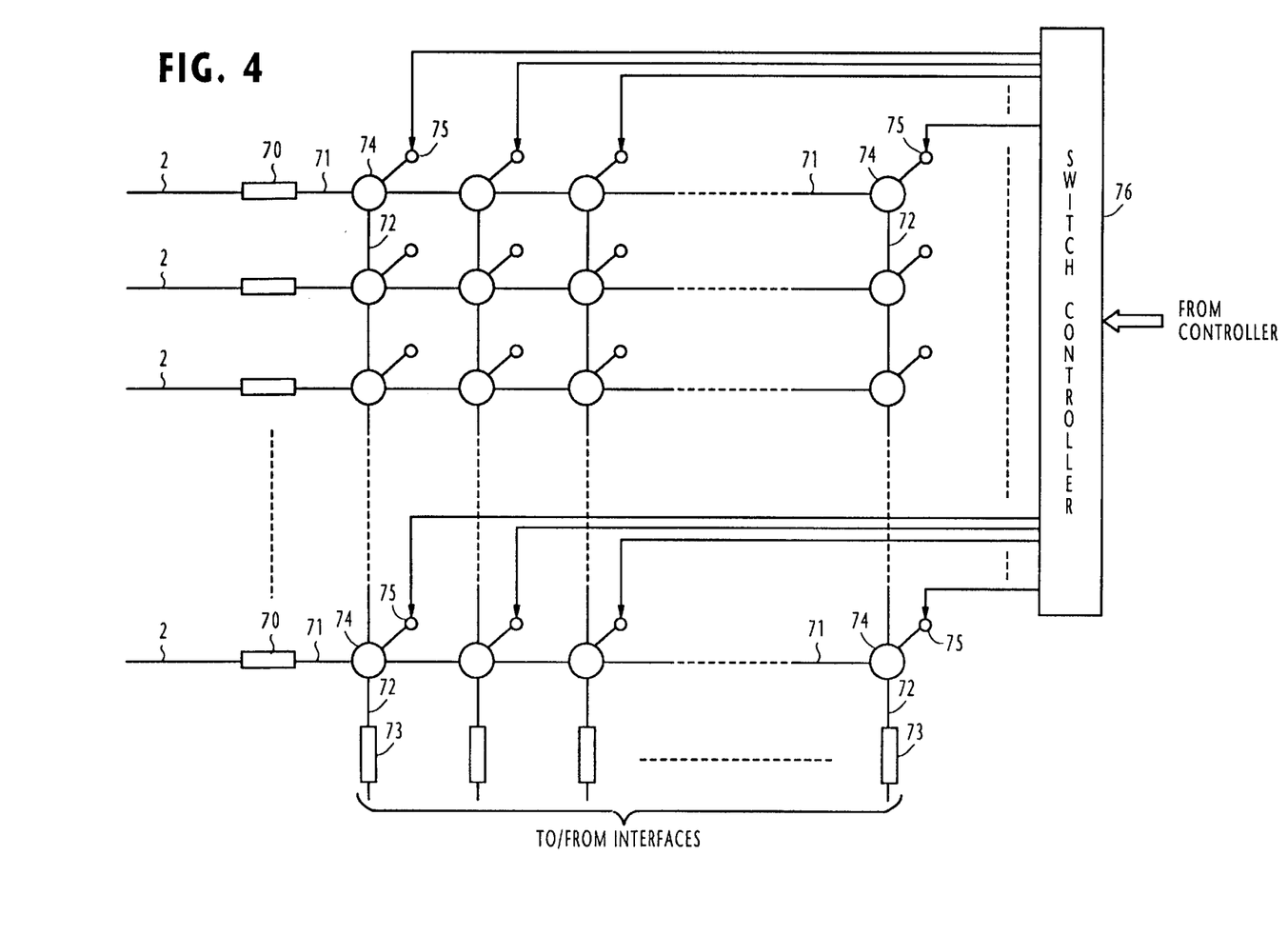
FIG. 4 is a block diagram of the photonic cross-connect switch of FIG. 1.

As shown in FIG. 4, the bi-directional photonic cross-connect switch 1 is implemented with a matrix array of bi-directional photonic switching elements 74 respectively connected to the cross-points of row optical waveguides 71 and column optical waveguides 72. The optical fiber transmission links 2 are connected via ports 70 to the row waveguides 71 and the column waveguides 72 are connected via ports 73 to the interface units 3. Each of the switching elements 74 has a control terminal 75 connected to a corresponding output terminal of a switch controller 76 where control data from the controller 12 are converted to an appropriate voltage signal.

Application of a control voltage to the control terminal 75 of each photonic switching element 74 causes it to establish a connection at the cross-point of the corresponding row and column waveguides. Each photonic switching element 74 is formed of a dielectric substance whose diffraction coefficient is varied in accordance with the level of the control voltage to vary its light transmissivity. Since the photonic cross-connect switch 1 is bi-directional, the connection between the optical inks 2 and the interface units 3 can be flexibly reconfigured. Furthermore, the photonic switch 1 can be advantageously implemented on a chip size with dimensions of 100 (mm)×12 (mm)×6 (mm) for an 8×8 switching distribution.

Figure 5:
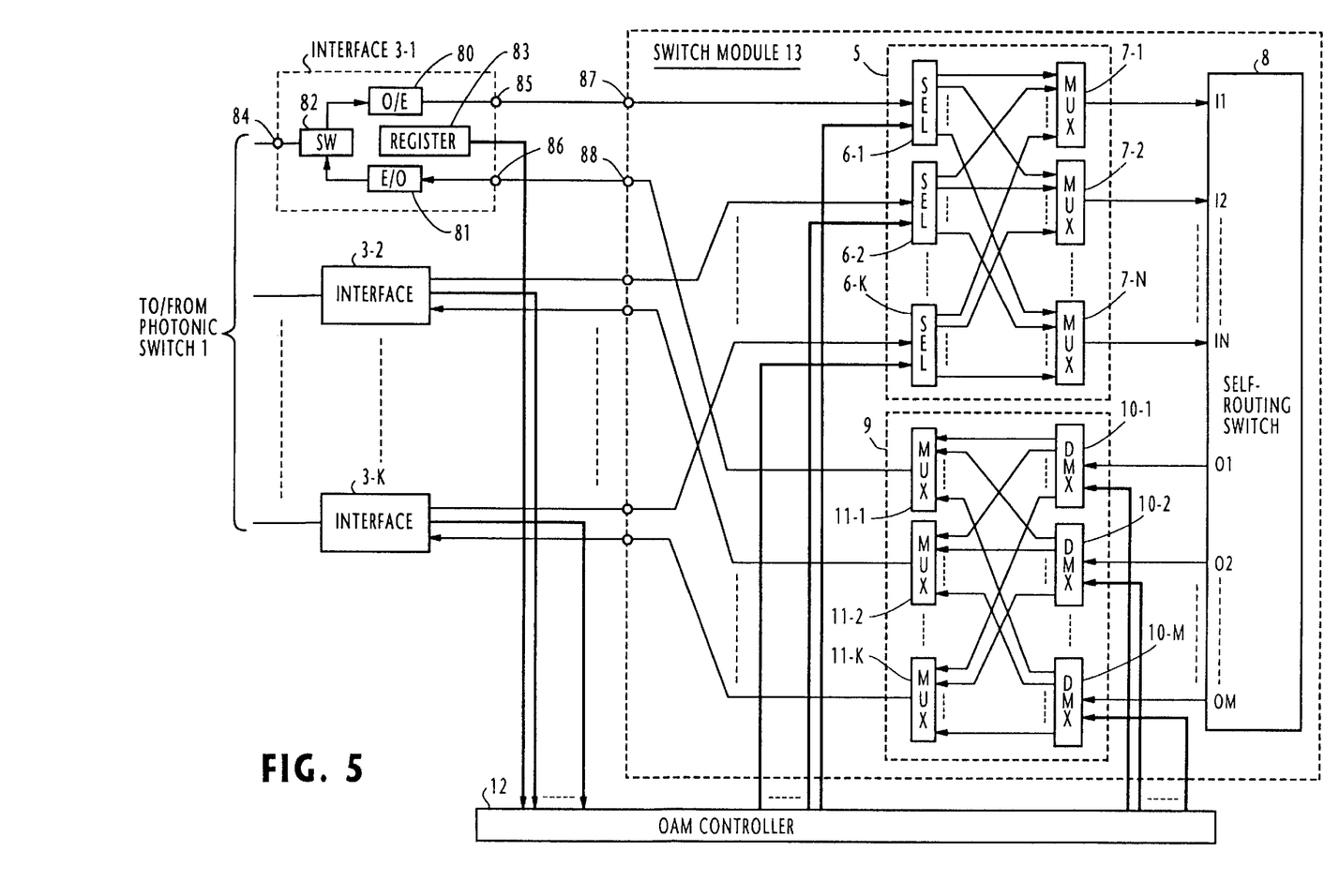
FIG. 5 is a block diagram of a modified ATM switching system of the present invention.

A modified form of the ATM switching system is FIG. 5. According to this modification, each interface unit 3 is implemented with an O/E converter 80, an E/O converter 81, a manually operated optical switch 82 and a register 83 in which data indicating the operating mode (incoming or outgoing mode) of the interface and its operating speed are store. A corresponding port of the photonic switch 1 is connected to a terminal 84. Switch 82 is used to connect the corresponding port of the switch via terminal 84 to the input of O/E converter 80 when the interface operates in the incoming mode or connect the output of E/O converter 81 to the terminal 84 when the interface operates in the outgoing mode. The output of O/E converter 80 is connected via an output terminal 85 and a corresponding input terminal of the switch module 13 to the selector 6-1. The output terminal of multiplexer 11-1 is connected via a corresponding output terminal 88 and an input terminal 86 of interface 3-1 to the input of E/O converter 81. The data stored in registers 83 of all interface units 3 are collected by the controller 12 where they are used to control the selectors 6-1 through 6-K and demultiplexers 10-1 through 10M.

What is claimed is:

1. An ATM switching system comprising:
   a plurality of interface units;
   a plurality of bi-directionally coupling switches corresponding to said interface units, each of said switches having first and second terminals and establishing a connection between the corresponding interface unit and one of said first and second terminals;
   a self-routing switch having a plurality of input ports and a plurality of output ports;
   an input distribution network for establishing connections between the first terminals and said bi-directionally coupling switches and the input ports of said self-routing switch;
   an output network distribution for establishing connections between the output ports of said self-routing switch and the second terminals of said bi-directionally coupling switches; and
   a controller for controlling said bi-directionally coupling switches and, said input and output distribution networks in accordance with directions of signals passing through said interface units and operating speed of the interface units and operating speed of the interface units.

2. An ATM switching system as claimed in claim 1, wherein said input distribution network comprises:
   a plurality of selectors respectively corresponding to said bi-directionally coupling devices, each selector having an input terminal connected to the first terminal of the corresponding bi-directionally coupling device and a plurality of output terminals for selectively establishing a connection between the input terminal to one of the output terminals; and
   a plurality of first multiplexers each for multiplexing signals at the output terminals of a different one of said selectors onto a corresponding one of the input ports of the self-routing switch, said output distribution network comprising:

a plurality of second multiplexers respectively corresponding to said bi-directionally coupling devices, each second multiplexer multiplexing signals applied thereto onto the second terminal of the corresponding bi-directionally coupling device; and a plurality of demultiplexers respectively corresponding to the output ports of the self-routing switch, each demultiplexer selectively establishing a connection between the corresponding output port to said second multiplexers.

3. An ATM switching system as claimed in claim 1, wherein each of said interface units includes means for supplying data to said controller indicating the directions of signals passing through said interface units and the operating speed of the interface units.

4. An ATM switching system as claimed in claim 1, wherein said interface units include electro-optical converters and opto-electrical converters.

5. An ATM switching system as claimed in claim 4, further comprising a photonic switch, the photonic switch including a matrix array of bi-directional photonic switching elements each being connected to a corresponding one of cross-points of a plurality of rows of optical waveguides and a plurality of columns of optical waveguides, each of said photonic switching elements being responsive to a control signal applied thereto for establishing a path at the corresponding cross-point in one of opposite directions of transmission, said rows of optical waveguides being respectively connected to optical transmission links and said columns of optical waveguides being respectively connected to said interface units.

6. An ATM switching system as claimed in claim 5, wherein the control signal applied to each of said bi-directional photonic switching elements is produced by said controller.

7. An ATM switching system comprising:

a plurality of interface units, each having first, second and third terminals for interfacing between said first terminal and one of said second and third terminals;

a self-routing switch having a plurality of input ports and a plurality of output ports;

an input distribution network for establishing connections between the second terminals of said interface units and the input ports of said self-routing switch;

an output distribution network for establishing connections between the output ports of said self-routing switch and the third terminals of said interface units; and a controller for controlling said input and output distribution networks in accordance with directions of signals passing through said interface units and operating speed of the interface units.

8. An ATM switching system as claimed in claim 7, wherein said input distribution network comprises:

a plurality of selectors respectively corresponding to said interface units, each selector having an input terminal connected to the second terminal of the corresponding interface unit and a plurality of output terminals for selectively establishing a connection between the input terminal to one of the output terminals; and a plurality of first multiplexers each for multiplexing signals at the output terminals of a different one of said selectors onto a corresponding one of the input ports of the self-routing switch, said output distribution network comprising:

a plurality of second multiplexers respectively corresponding to said interface units, each second multiplexer multiplexing signals applied thereto onto the third terminal of the corresponding interface unit; and a plurality of demultiplexers respectively corresponding to the output ports of the self-routing switch, each demultiplexer selectively establishing a connection between the corresponding output port to said second multiplexers.

9. An ATM switching system as claimed in claim 7, wherein each of said interface units includes means for supplying data to said controller indicating the directions of signals passing through said interface units and the operating speed of the interface units.

10. An ATM switching system as claimed in claim 9, wherein said interface units include electro-optical converters and opto-electrical converters.

11. An ATM switching system as claimed in claim 10, further comprising a photonic switch, the photonic switch including a matrix array of bi-directional photonic switching elements each being connected to a corresponding one of cross-points of a plurality of rows of optical waveguides and a plurality of columns of optical waveguides, each of said photonic switching elements being responsive to a control signal applied thereto for establishing a path at the corresponding cross-point in one of opposite directions of transmission, said rows of optical waveguides being respectively connected to optical transmission links and said columns of optical waveguides being respectively connected to said interface units.

12. An ATM switching system as claimed in claim 11, wherein the control signal applied to each bi-directional photonic switching element is produced by said controller according to the data supplied from said interface units.

13. An ATM switching module comprising:

a self-routing switch having a plurality of input ports and a plurality of output ports, the self-routing switch further enabling connections to one or more interface units having a second terminal and a third terminal;

an input distribution network for selectively establishing connections between the second terminal of said interface units and the input ports of said self-routing switch; and an output distribution network for selectively establishing connections between the output ports of said self-routing switch and the third terminals of said interface units.

14. An ATM switching module as claimed in claim 13, wherein the input distribution network comprises:

a plurality of selectors each having an input terminal and a plurality of output terminals, each selector selectively establishing a connection between the input terminal and one of the output terminals according to a first control signal applied thereto; and a plurality of first multiplexers each having a plurality of input terminals and an output terminal connected to one of the input ports of the self-routing switch, the input terminals of each first multiplexer being connected to receive signals from a different one of said selectors, said output distribution network comprising:

a plurality of demultiplexers each having an input terminal connected to one of the output ports of the self-routing switch and a plurality of output terminals, each demultiplexer establishing a connection between the input terminal and the output terminals according to a second control signal applied thereto; and a plurality of second multiplexers each having a plurality of input terminals and an output terminal, the input terminal of each second multiplexer being connected to receive signals from any one of said demultiplexers.

15. An ATM switching module as claimed in claim 14, further comprising a plurality of bi-directionally coupling devices each having first, second and third terminals for establishing a connection between the first terminal and one of said second and third terminals according to a third control signal applied thereto, the second terminal of each bi-directionally coupling device being connected to the input terminal of one of said selectors and the third terminal of each bi-directional coupling switch being connected to the output terminal of one of the second multiplexers.

16. The ATM switching module as claimed in claim 13, wherein the input distribution network comprises:

a plurality of selectors each having an input terminal and a plurality of output terminals, each selector selectively establishing a connection between the input terminal and one of the output terminals according to the first control signal applied thereto; and a plurality of first multiplexers each having a plurality of input terminals and an output terminal connected to one of the input ports of the self-routing switch, the input terminals of each first multiplexer being connected to receive signals from a different one of said selectors, said output distribution network comprising:

a plurality of demultiplexers each having an input terminal connected to one of the output ports of the self-routing switch and a plurality of output terminals, each demultiplexer establishing a connection between the input terminal and the output terminals according to the second control signal applied thereto; and a plurality of second multiplexers each having a plurality of input terminals and an output terminal, the input terminals of each second multiplexer being connected to receive signals from any one of said demultiplexers.

17. An ATM switching system comprising:

a plurality of interface units;

a plurality of bi-directional coupling devices corresponding to said interface units, each of said bi-directional coupling devices having first and second terminals and establishing a switched connection between the corresponding interface unit and one of said first and second terminals according to a first control signal applied thereto;

a self-routing switch having a plurality of input ports and a plurality of output ports;

an input distribution network for establishing a switched connection between the first terminals of said bi-directional coupling devices and the input ports of said self-routing switch according to a second control signal applied thereto;

an output network distribution for establishing a switched connection between the output ports of said self-routing switch and the second terminals of said bi-directional coupling devices according to a third control signal applied thereto; and a controller for producing said first, second and third control signals in accordance with directions of transmission of signals passing through said interface units and operating speed of the interface units and operating speed of the interface units.

18. The ATM switching system as claimed in claim 17, wherein said input distribution network comprises:

a plurality of selectors respectively corresponding to said bi-directional coupling devices, each selector having an input terminal connected to the first terminal of the corresponding bi-directional coupling device and a plurality of output terminals for selectively establishing a connection between the input terminal to one of the output terminals; and a plurality of first multiplexers each for multiplexing signals at the output terminals of a different one of said selectors onto a corresponding one of the input ports of the self-routing switch, said output distribution network comprising:

a plurality of second multiplexers respectively corresponding to said bi-directional coupling devices, each second multiplexer multiplexing signals applied thereto onto the second terminal of the corresponding bi-directional coupling device; and a plurality of demultiplexers respectively corresponding to the output ports of the self-routing switch, each demultiplexer selectively establishing a connection between the corresponding output port to said second multiplexers.

19. An ATM switching system comprising:

a plurality of interface units, each having first, second and third terminals for interfacing between said first terminal and one of said second and third terminals;

a self-routing switch having a plurality of input ports and a plurality of output ports;

an input distribution network for establishing a switched connection between the second terminals of said interface units and the input ports of said self-routing switch according to a first control signal applied thereto;

an output distribution network for establishing a switched connection between the output ports of said self-routing switch and the third terminals of said interface units according to a second control signal applied thereto; and a controller for producing said first and second control signals in accordance with directions of transmission of signals passing through said interface units and operating speed of the interface units.

20. An ATM switching system as claimed in claim 19, wherein said input distribution network comprises:

a plurality of selectors respectively corresponding to said interface units, each selector having an input terminal connected to the second terminal of the corresponding interface unit and a plurality of output terminals for selectively establishing a connection between the input terminal to one of the output terminals; and a plurality of first multiplexers each for multiplexing signals at the output terminals of a different one of said selectors onto a corresponding one of the input ports of the self-routing switch, said output distribution network comprising:

a plurality of second multiplexers respectively corresponding to said interface units, each second multiplexer multiplexing signals applied thereto onto the third terminal of the corresponding interface unit; and a plurality of demultiplexers respectively corresponding to the output ports of the self-routing switch, each demultiplexer selectively establishing a connection between the corresponding output port to said second multiplexers.

* * * * *